United States Patent
Bahr et al.

(10) Patent No.: US 9,712,517 B2
(45) Date of Patent: Jul. 18, 2017

(54) METHOD FOR IDENTIFYING A TASK AUTHORIZATION

(71) Applicant: Unify GmbH & Co. KG, Munich (DE)

(72) Inventors: Michael Bahr, Munich (DE); Christian Schwingenschlögl, Putzbrunn (DE)

(73) Assignee: Unify GmbH & Co. KG, Munich (DE)

( * ) Notice: Subject to any disclaimer, the term of this patent is extended or adjusted under 35 U.S.C. 154(b) by 94 days.

(21) Appl. No.: 14/754,795

(22) Filed: Jun. 30, 2015

(65) Prior Publication Data

US 2015/0319163 A1 Nov. 5, 2015

Related U.S. Application Data

(63) Continuation of application No. 12/226,177, filed as application No. PCT/EP2007/052570 on Mar. 19, 2007, now abandoned.

(30) Foreign Application Priority Data

Apr. 11, 2006 (DE) .................. 10 2006 017 029
Aug. 2, 2006 (DE) .................. 10 2006 036 107

(51) Int. Cl.
*H04L 29/00* (2006.01)
*H04L 29/06* (2006.01)
(Continued)

(52) U.S. Cl.
CPC ........ *H04L 63/0823* (2013.01); *G06F 21/606* (2013.01); *G06F 21/6209* (2013.01);
(Continued)

(58) Field of Classification Search
CPC ........... G06F 17/30; H04L 12/28; H04W 4/00
(Continued)

(56) References Cited

U.S. PATENT DOCUMENTS 6,751,729 B1   6/2004 Giniger et al.
7,561,551 B2 * 7/2009 Metke ................ H04L 63/0869
                                                         370/310
(Continued)

FOREIGN PATENT DOCUMENTS

EP   1545073 A1   10/2004
WO   03029916 A2   4/2003
WO   2007118746 A1  10/2007

OTHER PUBLICATIONS

J. Agre, et al., "Secure Nomadic Wireless Mesh (SnowMesh) 802.11 TGs ESS Mesh Networking Proposal" Internet Citation, (online), May 2005 ZP00790220; Internet: URL:http://www/flacp.lfujitsulabs.com/snowmesh.pdf.
"A Cluster-Based Security Archetecture for Ad Hoc Networks", M. Bechler, H. J. Hof, D. Kraft, F. Phalke, L. Wolf, Mar. 2004, pp. 2393-2403.

(Continued)

*Primary Examiner* — Brandon Hoffman
*Assistant Examiner* — Michael D Anderson
(74) *Attorney, Agent, or Firm* — Buchanan Ingersoll & Rooney PC

(57) ABSTRACT

In an ad hoc mesh network, roles are assignment to the different network nodes, for example mesh point or mesh portal. The invention envisages that a network node identifies the certification and thus the permitted roles of another network node before it sends a message to said other network node. This ensures that the roles maintain their integrity and the security in the network is enhanced.

18 Claims, 2 Drawing Sheets

(51) Int. Cl.
    *G06F 21/60*     (2013.01)
    *G06F 21/62*     (2013.01)
    *H04W 12/08*     (2009.01)
    *H04W 84/20*     (2009.01)

(52) U.S. Cl.
    CPC ............. *H04L 63/10* (2013.01); *H04W 12/08* (2013.01); *H04W 84/20* (2013.01)

(58) Field of Classification Search
    USPC .......................................................... 726/10
    See application file for complete search history.

(56) References Cited

U.S. PATENT DOCUMENTS

| | | | |
|---|---|---|---|
| 2005/0228886 A1 | 10/2005 | Cain et al. | |
| 2010/0192202 A1* | 7/2010 | Ker | H04L 63/101 |
| | | | 726/4 |

OTHER PUBLICATIONS

"Mobile Commerce (M-COMM)", ETSI Standards, European Telecommunications Standards Institute, Sohpa-Antipo, FR, ETSI TS 102 207 V1.1.3—Aug. 2003.
Wilhelm van den Heuvel et al., "EFSOC: A Layered Framework for Developing Secure Interactions between Web-Services", Distributed and Parallel Databases, Kluwer Academic Publishers, BVO, vol. 18, No. 2, Sep. 1, 2005, pp. 115-145.
Network Working Group, "Ad hoc On-Demand Distance Vector (AODV) Routing"; C. Perkins, E. Belding-Royer, S. Das; Jul. 2003.
Network Working Group, "Optimized Link State Routing Protocol (OLSR)"; T. Clausen, P. Jacquet; Oct. 2003.
802.11i IEEE Standard for Information Technology—Telecommunications and Information Exchange Between Systems—Local and Metropolitan Area Networks—Specific Requirements, "Part 11: Wireless LAN Medium Access Control (MAC) and Physical Layer (PHY) Specifications"; Amendment 6: Medium Access Control (MAC) Security Enhancements; IEEE Computer Society, XP-002402752; Jul. 23, 2004.

* cited by examiner

METHOD FOR IDENTIFYING A TASK AUTHORIZATION

CROSS REFERENCE TO RELATED APPLICATIONS

This application is a continuation application of U.S. patent application Ser. No. 12/226,177, which is the US National Stage of International Application No. PCT/EP2007/052570, filed Mar. 19, 2007 and claims the benefit thereof. The International Application claims the benefits of German application No. 10 2006 017 029.6 filed Apr. 11, 2006, and German application No. 10 2006 036 107.5 filed Aug. 7, 2006. The International application and the German patent applications are incorporated by reference herein in their entirety.

FIELD OF INVENTION

The invention relates to a method for safeguarding a transmission of a message from a first network node to a second network node as well as to a network node.

BACKGROUND OF THE INVENTION

Self-organizing networks are currently standardized within IEEE 802.11S. In this standard different node classes are envisaged within the IEEE. Such node classes are for example:
  Mesh Point (MP)
  Mesh Access Point (MAP)
  Lightweight Mesh Point (LWMP)
  Station (STA)
  Mesh Portal (MPort).

These node classes, also referred to as roles, define functions which a particular network node can execute in the network. The node classes or roles thus correspond to the technical facilities of a respective network node in the network.

SUMMARY OF INVENTION

The object underlying the invention is to specify a method and a network node with which increased security is provided as regards its roles.

This object is achieved in respect of the method and the network node by the features the claims.

The method for identifying a task authorization for a task for a first network node comprises the following steps:
  Determining a security requirement assigned to the task;
  Checking whether the first network node fulfills the security requirement;
  If is does not, refusing the task authorization for the first network node.

The network involved can be a wired network or a wireless network. Wired networks are for example Ethernet networks or optical networks. Wireless network include WLAN networks, ad-hoc networks or mesh networks for example. The network can also consist of a mixture of the categories given.

One advantage of the inventive method lies in its enhanced security. The reason for this is that the task authorization is refused if the first network node does not fulfill the security requirement.

In a preferred embodiment of the invention the task comprises the receipt of a message to be sent by a network node to the first network node. Preferably the refusal includes the suppression of a transmission of the message from a network node to the first network node.

The result of this is that the security for the transmission of messages is increased. For transmission of the message the network node checks the security requirement assigned to the message. If the first network node does not meet this requirement, the transmission of the message to the latter is suppressed.

In an advantageous embodiment of the invention the security requirement is determined on the basis of the message type. Possible types of message are as follows:
  a message intended for the first network node;
  a message intended to be routed by the first network node;
  a route message, especially a Route Request or Route Reply message;
  a message of a further network node without mesh capabilities for routing into a mesh network.

In an alternate embodiment of the invention the task comprises routing a message of a network node by the first network node. Preferably the refusal includes not entering or removing the network node from a routing table of the network node.

The result able to be achieved by this is that a first network node which does not meet the security requirement will not be used at a later time for example for routing messages. This removal from the routing table means that it will no longer be necessary to check the security requirement at the later time.

It is useful for the check to be performed by the network node. This results in only a low load being imposed on the network by additional messages.

In an advantageous embodiment of the invention a certificate of the first network node is used for checking the security requirement, especially a certificate in accordance with X.509v3 Preferably the certificate has attributes on the basis of which the check is undertaken.

The use of an attribute certificate has the advantage, as well as certification of an identity, of also making possible a certification of a characteristic linked to the identity, i.e. an attribute. It is thus possible for example to issue a certificate with an attribute "Mesh Portal" to a network node.

Preferably a network node class is used as a task authorization, especially one of the following network node classes:
  Mesh Point;
  Mesh Access Point;
  Lightweight Mesh Point;
  Station;
  Mesh Portal.

This produces the advantage of the second network node being allocated a clear role, i.e. a node class, and simultaneously of the checking of the security requirement ensuring a secure transmission of the message. A further result is that a network node cannot always execute its full technical capabilities in the network.

The network node has a processing unit which is embodied such that, to determine a task authorization for a task for a first network node, it is able to undertake a determination of a security requirement assigned to the task, a check whether the first network node meets the security requirement and, if it does not, a refusal of the task authorization for the first network node.

The network node can for example be a VoIP-enabled telephone, a laptop, a mobile telephone, a PDA or a printer. Further possibilities are a computer, a router or a gateway.

Preferably the network node is embodied such that the refusal comprises the first network node not being entered into or being removed from the routing table of the network node.

In a preferred embodiment of the network node the task comprises receiving a message to be sent by a network node to the first network node and the refusal comprises the suppression of a transmission of the message to be sent.

The network features at least one such inventive network node. Preferably it is embodied as an ad-hoc network or a mesh network.

BRIEF DESCRIPTION OF THE DRAWINGS

Further details and advantages of the invention are explained on the basis of the drawing. The figures show.

DETAILED DESCRIPTION OF INVENTION

Figure 1:
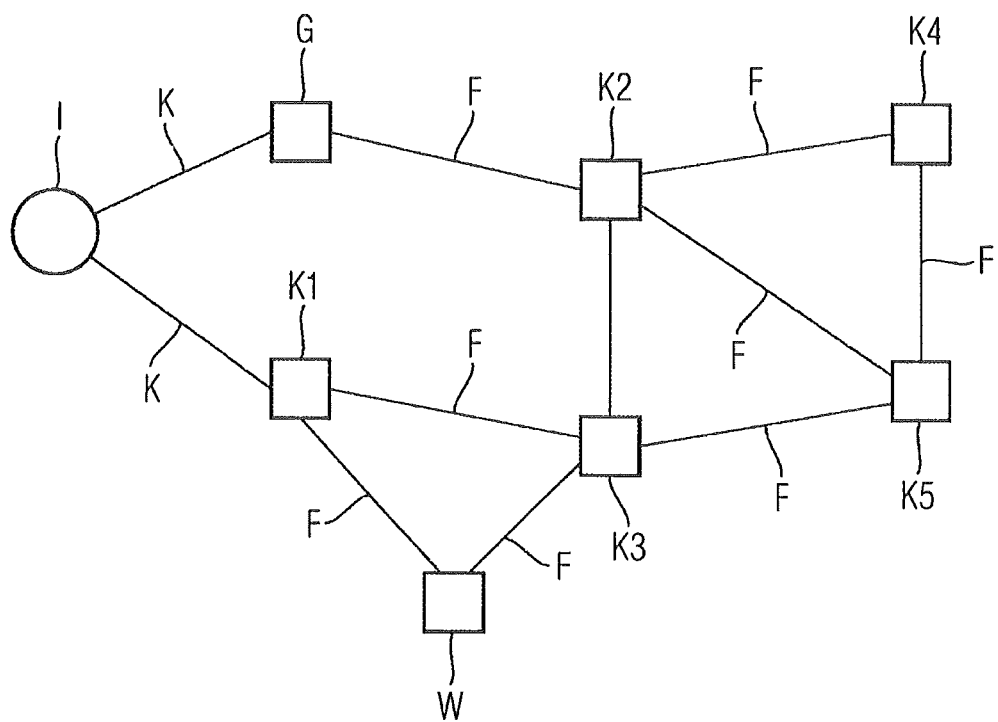
FIG. 1 is a block diagram of a mesh network and FIG. 2 is flow chart illustrating an execution sequence of a process which runs in a network node.

The typical network shown in FIG. 1, the embodiments of which will be used as a basis to present the inventive method, consists of a first through fifth network node K1 . . . K5, a gateway G and a WLAN-enabled network node W. Furthermore the Internet I is shown schematically in FIG. 1, connected to the gateway G and the first network node K1.

In the network there are wireless connections F between the gateway G and the second network node K2, between the second network node K2 and the fourth, fifth and third network node K4, K5, K3, between the fourth network node K4 and the fifth network node K5, between the fifth network node K5 and the third network node K3, between the first network node K1 and the third network node K3, as well as between the WLAN-enabled network node W and the first and third network node K1, K3. There are also cabled connections K between the Internet I and the gateway G as well as between the Internet I and the first network node K1.

Each of the network nodes K1 . . . K5, as well as the gateway G and the WLAN-enabled network node W is assigned a respective attribute certificate. This is checked to allow an assignment of roles, i.e. network node classes, to the network nodes K1 . . . K5, the gateway G and the WLAN-enabled network node W.

The WLAN-enabled network node W is not enabled for the mesh network. In order to be able to communicate with the mesh network, i.e. the network nodes K1 . . . K5 or the gateway G or the Internet I, the WLAN-enabled network node W must be given access to the mesh network. This requires a network node K1 . . . K5 with a technical capability to function as a Mesh Access Point (MAP), and with the authorization to do this. Furthermore this network node K1, K3 must be in direct connection with the WLAN-enabled network node W. In this typical network the first and third network node K1, K3 should be technically capable of making it possible for the WLAN-enabled network node W to have access to the mesh network. Furthermore however only the first network node K1 should have the attribute "Mesh Access Point" in its attribute certificate. The third network node K3 does not have this attribute in its attribute certificate. This means that the third network node K3 may not assume the role, i.e. network node class, of a Mesh Access Point. The WLAN-enabled network node W takes on the checking of the corresponding attribute certificate. For example the WLAN-enabled network node W would like to send a message to the fourth network node K4. The WLAN-enabled network node W knows about the presence of the first and third network node K1, K3. It now first checks the attribute certificate of the third network node K3, by sending a message to this network node K3 and receiving the attribute certificate as a reply from the third network node K3. The outcome of the check on the attribute certificate is that third network node K3 may not assume the role of a Mesh Access Point. The WLAN-enabled network node W therefore does not send the message to the third network node K3. The outcome of a similar check on the first network node K1 is that the first network node K1 may assume the role of the Mesh Access Point. The WLAN-enabled network node W thus sends its message directed to the fourth network node K4 to the first network node K1, which routes said message, for example via the third and fifth network node K3, K5 to the fourth network node K4.

For routing of messages of the WLAN-enabled network node W to the fourth network node K4 via the first network node K1 further roles are necessary at the third and fifth network nodes K3, K5. In this case the role concerned is that of a Mesh Point (MP). Before the first network node K1 routes the message of the WLAN-enabled network node W to the third network node K3, it checks whether the third network node K3 may fulfill the role of a Mesh Point. The first and third network nodes K3 are members of the mesh network. The first network node K1 thus maintains the third network node K3 in a routing table. Also stored in this routing table are the roles that the third network node K3 may fulfill, based on its attribute certificate. In the example given the third network node K3 is to be able to assume the role of a Mesh Point. This means that the third network node K3 may route the message from the WLAN-enabled network node W within the mesh network. It is thus ensured in this exemplary embodiment that, although the third network node K3 may not undertake the connection of merely WLAN-enabled network nodes W to the mesh network, it may however route messages, even those from the WLAN-enabled network node W into the mesh network if they thus do not come directly from the WLAN-enabled network node W. The first network node K1 thus sends the message to the third network node K3. In a similar way the third network node K3 checks whether the fifth network node K5 may route the message. Since also the fifth network node K5 in this example may assume the role of a Mesh Point, the third network node K3 sends to the fifth network node K5. No further checking is required for routing the message to the fourth network node K4, for which the message is intended.

In the given example for the message of the WLAN-enabled network node W it has been assumed that each network node K1, K3, K5 lying on the way knows the path to the fourth network node, i.e. the next network node on the route. If however this is not the case, a routing algorithm must be executed. If the Ad hoc On-Demand Distance Vector (AODV) routing protocol is used, Route-Request messages are sent from the egress node for routing. If these reach the respective destination node K1 . . . K5 or another network node K1 . . . K5, that knows a route to the destination node K1 . . . K5 Route-Reply messages are sent back to the egress node. In this exemplary embodiment of the inventive method even before sending of the Route-Request messages it is checked in each case whether a receiving network node K1 . . . K5 may assume the role of a Mesh Point for routing messages. If a respective network node K1 . . . K5 does not do this, the Route-Request message is not send. This avoids routes being found that contain a network node which does have the necessary authorization, since a routing of messages via such a route would not be successful.

It is also possible in one embodiment variant to check in the Route-Reply messages whether a corresponding network node has the necessary authorization for assuming a role as the Mesh Point. Since a Route-Reply message is normally sent as a unicast message, it must be ensured here that a path will actually be found. To this end for example a number of Route-Reply messages can be sent. Another possibility lies in carrying out a repeated execution of the routing method with Route-Request and Route-Reply messages until a suitable path is found.

A further role to be checked represents the role of the Mesh Portal. A network node with the Mesh Portal role can provide a connection between network node K1 . . . K5 in the mesh network and network nodes in an external network, such as for example the Internet I. To make sure that this functionality also can only be offered by network nodes K1 . . . K5 authorized to do so can, each network node K1 . . . K5, wishing to send a message to the Internet I checks the attribute certificate of the respective next routing network node K1 . . . K5 to see whether only one further hop exists in the mesh network between the Internet I and the current network node K1 . . . K5. This prerequisite is fulfilled if the next following routing network node K1 . . . K5, G represents a Mesh Portal from the technical standpoint. In this case it must be checked whether this network node may also assume the role of the Mesh Portal.

To this end an example is given in which the third network node K3 would like to send a message into the Internet I. In the given example network there are two options. On the one hand the message can be sent via the gateway G to the Internet I, on the other via the first network node K1.

However in this example it is the case that only the gateway G has an authorization to act as a Mesh Portal in its attribute certificate. The first network node K1 does not have this attribute in its attribute certificate. The first network node K1, despite its connection to the Internet I, may thus not route any messages from the mesh network to the Internet I. The third network node K3 now establishes for example that the path to the Internet I is at its shortest via the first network node K1. Before the message is sent to the first network node K1 it checks the attribute certificate of the first network node K1 however. Since the first network node K1 would already be that network node which would have to undertake the routing into the Internet I, the attribute certificate of the first network node K1 is checked by the third network node K3 as to whether the first network node K1 may assume the role of a Mesh Portal. This is not the case. The third network node K3 must thus seek another route for its message into the Internet I. Such a route is available for example via the second network node K2 and the gateway G. A check is now due, as described above, as to whether the second network node K2 may assume the function of a Mesh Point, in order to be able to route the message to the gateway G at all. This is the case. The message is thus transmitted to the second network node K2.

A check as to whether the second network node K2 may assume Mesh Portal functionality does not have to be conducted by the third network node K3. The reason for this is that two links of the mesh network are still to be negotiated from the third network node K3 to the gateway G. In its turn this means that the second network node. K2 is not that network node which takes care of a direct routing of the message into the Internet I.

The second network node K2 in its turn must check for the gateway G, whether the latter may execute the Mesh Portal function. According to the attribute certificate of the gateway G the latter is authorized for executing the role of the Mesh Portal. Thus the second network node K2 may route the message to the gateway G. The gateway G in its turn takes care of routing the message into the Internet I.

The second network node K2 must know or be able to establish for the message of the third network node K, that it has the Internet I as its destination. This is for example able to be detected on the basis of the address area of the destination address of that of the message.

There is a further embodiment variable for checking the role of the Mesh Portal. In this alternative all network nodes wishing to offer a mesh portal function, i.e. those wishing to assume the network node class of the Mesh Portal, must send messages into the network, with which they make their function known. In this alternative these messages are only accepted, if a simultaneous checking of its attribute certificate by the other network node K1 . . . 5 of the network is successful, i.e. if the corresponding network node may offer the Mesh Portal functionality.

In a further variant, to discover Mesh Portal network nodes, a similar mechanism is employed as is used for routing via Route Request and Route Reply messages. This means that a network node K1 . . . 5, wishing for example to send a message into the Internet I, typically sends Mesh Portal Request messages into the network. Mesh Portal reply messages are however only sent if a further network node K1 . . . 5 has a Mesh Portal network node as its neighboring node. Furthermore the Mesh Portal reply messages are only sent if a check has also been made for the neighboring nodes as to whether its attribute certificate allows it to assume the role of Mesh Portal.

By means of the inventive method and for example the execution options of the inventive method described it is made possible to maintain different roles of network nodes in for example multi-hop mesh networks and thereby for example to implement the security features necessary for enterprise networks. Via the definition of additional attributes, which describe further roles for example, there is also the option of designing a significantly finer security management. Furthermore the attribute certificates employed are also able to be used for safeguarding services on higher layers, for example the certification of components and services in Service Discovery protocols.

A second embodiment of the invention consists of the routing tables for messages being created in a passive manner at the network nodes K1 . . . 5. In a passive manner means that beacon messages are primarily used for creating the routing tables.

A network node K1 . . . 5 accepts the beacon messages (beacons) that it can receive and creates a routing table from these. The beacons each contain in this second embodiment the security certificate of the sending network node K1 . . . 5. A network node K1 . . . 5 that receives a beacon only inserts the sending network node K1 . . . 5 into its routing table if the security for routing is fulfilled, i.e. if its attribute certificate contains the Mesh Point role as an attribute.

The result achieved is that a message can be routed without new checking of the attribute certificate, since only the network nodes K1 . . . 5 are in the routing table which enter into consideration at all for routine.

It is worthwhile here to maintain routing tables for different roles, i.e. node classes. Thus a first routing table can be used for routing messages within the mesh network; i.e. the first routing table only contains network nodes K1 . . . 5, that may assume the role of Mesh Point. A second routing table is used to hold such network nodes K1 . . . 5 as may exercise the role of Mesh Portal or Mesh Access Point. Depending on the task set, a network node K1 . . . 5 can look into one of the routing tables for the network node K1 . . . 5 to which it may route a predetermined message.

Figure 2:
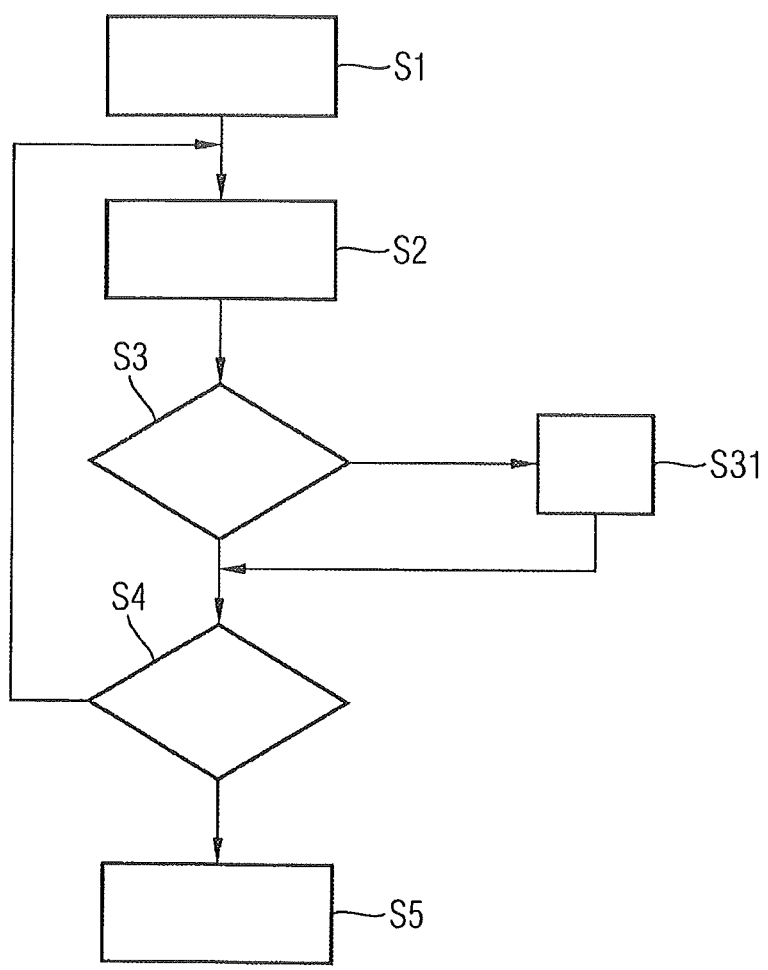

FIG. 2 shows a typical execution sequence of a process which runs in a network node K1 . . . 5, if a message is to be sent from this network node K1 . . . 5 to a destination node. In this case the message can originate from the network node K1 . . . 5 itself or can already have been sent to this for routing. The process is executed in this way if the destination node is not directly accessible for the network node K1 . . . 5, i.e. if routing through an intermediate node is necessary.

In a first step S1 the network node K1 . . . 5 receives the message for routing. In a second step S2 the network node K1 . . . 5, decides on the intermediate node to which the message is to be routed. This decision can typically be made on the basis of a routing table. In a subsequent third step S3 the network node K1 . . . 5, checks whether an attribute certificate for the intermediate node is known to it. If is not, an attempt is made in an intermediate step S31 to obtain this attribute certificate. This is done by a request message being transmitted to the intermediate node in which the intermediate node is requested to send its attribute certificate in a response to the network node K1 . . . 5.

With the now known attribute certificate the network node K1 . . . 5 checks in a fourth step S4, whether the attribute certificate has the necessary attribute for the routing, i.e. whether the intermediate node may undertake the routing. If it may not, the network node K1 . . . 5 returns to the second step S2 and attempts to find another intermediate node.

If however the intermediate node may accept the task, in a fifth step the network node K1 . . . 5 sends the message to the intermediate node.

The invention claimed is:

1. A method for identifying an authorization for a second network node of a network for receiving a message to be sent by a first network node of the network, the first network node comprising a processing unit communicatively connected to non-transitory memory, the message originating from the first network node itself or having been sent to the first network node for routing, the method comprising:
    determining, by the first network node, a security attribute of a node class of the second network node that is needed for the second network node to be authorized to receive the message based on a type of the message in response to originating the message or receiving the message for routing of the message, the security attribute requiring a technical capability of a node to perform a function of a device identifiable from the node class of the security attribute and requiring authorization of the second network node to function in the node class within the network to receive the message, the node class comprising one of:
    Mesh Point,
    Mesh Access Point,
    Lightweight Mesh Point,
    Station, and
    Mesh Portal;
    checking by the first network node a certificate of the second network node, the certificate comprising an attribute of a network node class being used as authorization for receiving the message wherein the first network node checks whether the certificate of the second network node comprises an attribute fulfilling the security attribute needed to be authorized to receive the message;
    in response to determining that the certificate of the second network node comprises an attribute fulfilling the security attribute such that the second network node is authorized to assume a role of the node class within the network that is identified by the security attribute, the first network node sending the message to the second network node for transmission of the message;
    in response to determining that the certificate of the second network node does not comprise an attribute fulfilling the security attribute such that the second network node is not authorized to assume the role of the node class within the network that is identified by the security attribute, the first network node refusing the authorization for the second network node for the receiving of the message and checking whether a certificate of a third network node comprises an attribute fulfilling the security attribute for transmission of the message.

2. The method as claimed in claim 1, with the refusing of the authorization of the second network node includes a suppression of sending the message from the first network node to the second network node.

3. The method as claimed in claim 2, wherein the determination of the security attribute of the second network node is undertaken based on a type of the message being at least one of the following types:
    a message intended to be routed by the second network node;
    a route message,
    a Route-Request,
    a Route-Reply message; and
    a message from a non-mesh-enabled device for routing into a mesh network, the first and second nodes being nodes of the mesh network.

4. The method as claimed in claim 1, comprising the first network node receiving the message prior to performing the checking of the certificate of the second network node.

5. The method as claimed in claim 4, wherein the refusing of the authorization of the second network node comprises not entering and/or removing an entry of the second network node from a routing table of the first network node.

6. The method as claimed in claim 1, wherein the network node class is used as the authorization for the receiving of the message.

7. The method as claimed in claim 1, wherein the certificate of the second network node comprises an attribute fulfilling the security attribute, comprising:
    the second network node receiving the message from the first network node;
    the second network node determining a security attribute of a node class of a third network node needed to receive the message based on the type of the message,
    the second network node checking a certificate of the third network node, the certificate being used as a security request, the certificate comprising an attribute of a network node class being used as authorization for the receiving of the message, wherein the second network node is to check whether the certificate of the third network node comprises an attribute fulfilling the security attribute of a node class of the third network node needed to receive the message;
    in response to determining that the certificate of the third network node does not comprise an attribute fulfilling the security attribute such that the third network node is not authorized to assume the role of the node class within the network that is identified by the security attribute, the second network node refusing the authorization for the third network node for the receiving of the message and checking whether a certificate of another network node comprises an attribute fulfilling the security attribute; and in response to determining that if the certificate of the third network node comprises an attribute fulfilling the security attribute such that the third network node is authorized to assume the role of the node class within the network that is identified by the security attribute, the second network node sending the message to the third network node.

8. A first network node comprising:

a processing unit communicatively connected to non-transitory memory, the first network node configured to determine an authorization for a second network node for receiving a message to be sent by the first network node within a network, the message originating from the first network node itself or having been sent to the first network node for routing toward a target device, the first network node configured to determine a security attribute of a node class of the second network node needed to receive the message based on a type of the message in response to originating the message or receiving the message for routing toward the target device, the security attribute requiring a technical capability of a node to perform a function of a device identifiable from the node class of the security attribute and requiring authorization of the second network node to function in the node class within the network to receive the message, the node class comprising one of:

Mesh Point,

Mesh Access Point,

Lightweight Mesh Point,

Station, and

Mesh Portal, the first network node configured to check a certificate of the second network node, the certificate comprising an attribute of a network node class being used as authorization for the receiving of the message, wherein the first network node is to check whether the certificate of the second network node comprises an attribute fulfilling the security attribute of a node class of the second network node needed to receive the message, the first network node configured to refuse the authorization for the second network node for the receiving of the message upon a determination that the certificate of the second network node does not comprise an attribute fulfilling the security attribute such that the second network node is not authorized to assume a role of the node class within the network that is identified by the security attribute and check whether a certificate of another network node comprises an attribute fulfilling the security attribute; and the first network node configured to send the message to the second network node upon a determination that the certificate of the second network node comprises an attribute fulfilling the security attribute such that the second network node is authorized to assume the role of the node class within the network that is identified by the security attribute.

9. The first network node as claimed in claim 8, wherein the first network node is configured to refuse the authorization of the second network node by not entering the second network node into a routing table of the first network node or removing the second network node from a routing table of the first network node.

10. The first network node as claimed in claim 8, wherein the message is received by the first network node for routing toward the target device and the first network node is configured to refuse the authorization of the second network node by suppression of the transmission of the message to be sent.

11. A network comprising the first network node of claim 8.

12. The network in accordance with claim 11, wherein the network is an ad-hoc network or a mesh network.

13. The network of claim 12, also comprising the second network node.

14. The network of claim 13, wherein the certificate of the second network node comprises an attribute fulfilling the security attribute and the second network node receives the message from the first network node;

the second network node configured to determine a security attribute of a node class of a third network node needed to receive the message based on the type of the message, the second network node configured to check a certificate of the third network node, the certificate comprising an attribute of a network node class being used as authorization for the receiving of the message, wherein the second network node is to check whether the certificate of the third network node comprises an attribute fulfilling the security attribute of a node class of the third network node needed to receive the message, the second network node configured to refuse the authorization for the third network node for the receiving of the message upon a determination that the certificate of the third network node does not comprise an attribute fulfilling the security attribute such that the third network node is not authorized to assume the role of the node class within the network that is identified by the security attribute and check whether a certificate of another network node comprises an attribute fulfilling the security attribute; and the second network node configured to send the message to the third network node upon a determination that the certificate of the third network node comprises an attribute fulfilling the security attribute such that the third network node is authorized to assume the role of the node class within the network that is identified by the security attribute.

15. The network of claim 14, comprising the third network node, wherein the certificate of the third network node comprises an attribute fulfilling the security attribute and the third network node receives the message from the second network node;

the third network node configured to determine a security attribute of a node class of a fourth network node needed to receive the message based on the type of the message, the third network node configured to check a certificate of the fourth network node, the certificate comprising an attribute of a network node class being used as authorization for the receiving of the message, wherein the third network node is to check whether the certificate of the fourth network node comprises an attribute fulfilling the security attribute of a node class of the fourth network node needed to receive the message, the third network node configured to refuse the authorization for the fourth network node for the receiving of the message upon a determination that the certificate of the fourth network node does not comprise an attribute fulfilling the security attribute such that the fourth network node is not authorized to assume the role of the node class within the network that is identified by the security attribute and check whether a certificate of a fifth network node comprises an attribute fulfilling the security attribute; and the third network node configured to send the message to the fourth network node upon a determination that the certificate of the fourth network node comprises an attribute fulfilling the security attribute such that the third network node is authorized to assume the role of the node class within the network that is identified by the security attribute; and wherein the first, second, third, fourth, and fifth network nodes are nodes of the network and the message is directed to the target device.

16. The network of claim 15, wherein the message is to be sent toward the target device via the network.

17. The network of claim 14, wherein the message is to be sent toward the target device via the network.

18. The network of claim 11, wherein the message is to be sent toward the target device via the network.

* * * * *